United States Patent [19]
Tsai

[11] Patent Number: 5,979,609
[45] Date of Patent: Nov. 9, 1999

[54] DISK BRAKE DEVICE FOR USE WITH A BICYCLE

[76] Inventor: Ming-Ta Tsai, No. 2, Lane 292, San-Chun St., Shu-Lin Chen, Taipei Hsien, Taiwan

[21] Appl. No.: 09/162,361

[22] Filed: Sep. 29, 1998

[51] Int. Cl.[6] .............................. B62L 3/02; F16D 55/22
[52] U.S. Cl. ........................... 188/26; 188/71.7; 188/72.7
[58] Field of Search ................... 188/2 D, 24.19, 188/24.22, 26, 58, 59, 71.1–71.4, 71.7, 72.1, 72.3, 72.7–72.9, 73.1, 344

[56] References Cited

U.S. PATENT DOCUMENTS

| | | | |
|---|---|---|---|
| 3,765,511 | 10/1973 | Toyowasu | 188/26 |
| 3,878,921 | 4/1975 | Kibler et al. | 188/26 |
| 3,989,124 | 11/1976 | Fujii | 188/26 |
| 3,997,033 | 12/1976 | Bulwer | 188/72.7 |
| 4,029,179 | 6/1977 | Butz | 188/72.7 |
| 4,117,909 | 10/1978 | Li | 188/217 |
| 4,267,903 | 5/1981 | Kita et al. | 188/72.6 |

*Primary Examiner*—Chris Schwartz
*Attorney, Agent, or Firm*—Bacon & Thomas, PLLC

[57] ABSTRACT

A disk brake device for use with a bicycle has a driven plate extending out from one of a pair of yokes receiving the driven plate therein. The driven plate defines therethrough a channel, such that an adjusting bolt is able to be inserted therethrough. A driving plate added between a driven plate and a brake shoe has a stud extending into the channel of the driven plate to be in contact with the adjusting bolt, such that movement of the adjusting bolt will result in the movement of the driving plate. Accordingly, the movement of the driving plate will cause the brake shoe to move closer to the disk securely positioned between two brake shoes.

6 Claims, 5 Drawing Sheets

DISK BRAKE DEVICE FOR USE WITH A BICYCLE

BACKGROUND OF THE INVENTION

1. Field of the Invention

The present invention relates to a disk brake device for use with a bicycle, and more particularly to a disk brake device having a driving plate disposed between a brake shoe and a driven plate and movably engaged with respect to the driven plate. Because the driven plate is provided with an adjusting bolt engaged with the driving plate, a gap between the driving plate and the brake shoe is adjusted when the adjusting bolt is adapted accordingly.

2. Prior Art Description

Conventional brake systems in a bicycle have a pair of brake shoes, one of which is fixed to the brake frame and the other is able to be moved to adjust the distance between itself and the disk or the like. Therefore, when one of the brake shoes is worn due to friction with the disk, the user can only make the necessary adjustment to the movable brake shoe, not the fixed one. Although adjusting the movable brake shoe after it has become worn can still accomplish the braking effect to fully stop the bicycle, it suffers from a series of problems which will substantially shorten the life span of the entire brake system, i.e. speeding the wear of the movable brake shoe, and unevenly wearing both sides of the disk. Moreover, when the user is trying to stop the bicycle, he may apply a great force to the movable brake shoe which will result in deformation of the disk. The deformed disk will therefore continuously contact with the fixed brake shoe and eventually damage it.

The present invention introduces a novel disk brake device that allows one to adjust distances between the disk and one of the respective brake shoes to reduce and/or mitigate the aforementioned problems.

SUMMARY OF THE INVENTION

The main objective of the invention is to provide a disk brake device having a driving plate disposed between a brake shoe and a driven plate which is able to he moved to force the driving plate moving toward the brake shoe. The brake shoe, after the driving plate is adjusted to move toward the brake shoe by the driven plate, is accordingly driven to shorten the distance with the disk.

Another objective of the invention is to provide a disk brake device for use with a bicycle. The disk brake device is movable with respect to the disk, such that before or after the adjustment of one of the brake shoes is made, the disk brake device is accordingly moved to reduce the distance between the other brake shoe and the disk.

Still another objective of the invention is to provide a pair of diametrically opposed inclined surfaces on the periphery of the driven plate. Each of the inclined surfaces receives at least one ball bearing therein in such a way that when the driven plate pivots, it will be forced to move linearly back and forth on an axis by the ball bearing.

Other objects, advantages and novel features of the invention will become more apparent from the following detailed description when taken in conjunction with the accompanying drawings.

BRIEF DESCRIPTION OF THE DRAWINGS

The present invention will now be better understood with reference to the following drawings, wherein.

DETAILED DESCRIPTION OF THE PREFERRED EMBODIMENT

Figure 1:
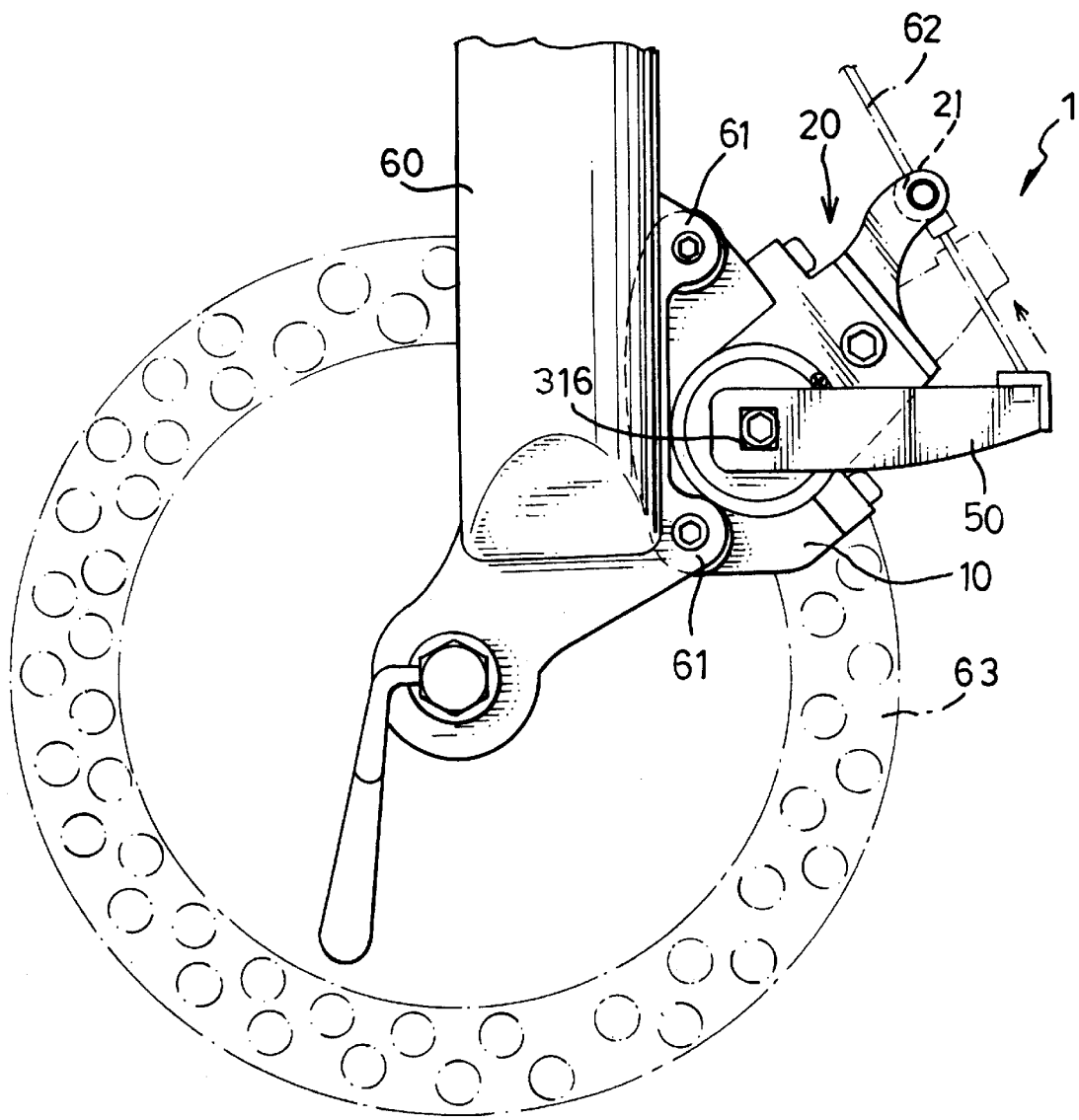
FIG. 1 is a schematic view showing the assembly of a disk brake device of the invention with the front fork of a bicycle.
Figure 2:
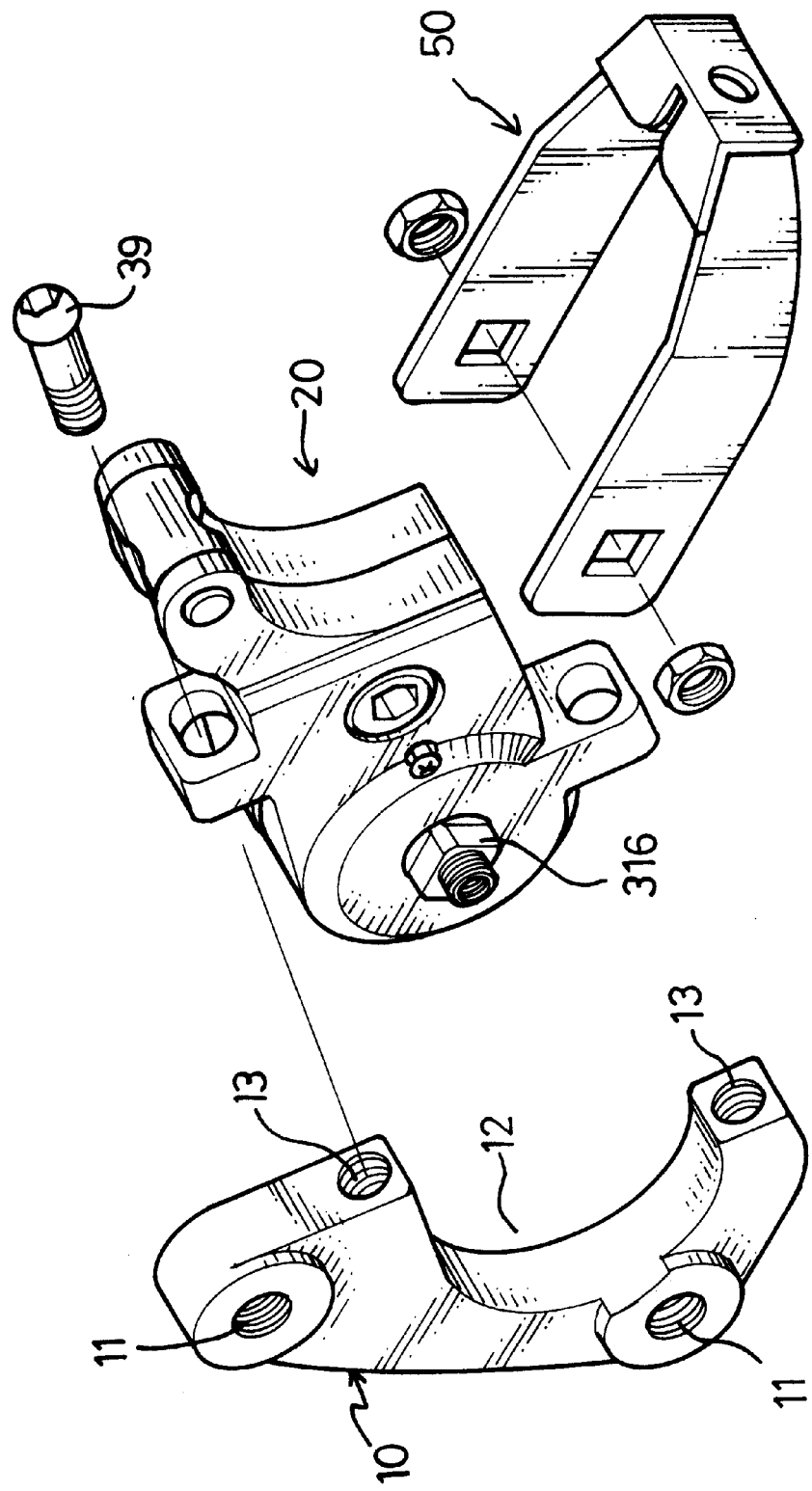
FIG. 2 is an exploded view of the bracket, the disk brake device and the hanger.

Referring to FIGS. 1 and 2, a disk brake device (1) of the invention is shown. The disk brake device (1) is securely engaged with a bracket (10) which is connected with a front fork (60) of the bicycle and has a pair of first holes (11), a recess (12) and a pair of second holes (13). The front fork (60) has two ears (61) each threadingly connected with one of the first holes (11) of the bracket (10). A hanger (50) pivotally connected with the disk brake device (1) has a brake line (62) (in phantom line) securely connected thereto and the brake line (62) passes through a guide (21) securely received within a yoke (20) of the device (1). It is to be noted that the disk brake device (1) of the invention comprises the bracket (10), the yoke (20) configured to be fixedly received in the recess (12) and the hanger (50) pivotally connected with the yoke (20). The operation of the disk brake device (1) is activated by the brake line (62) through which the hanger (50) pivots with respect to the yoke (20). An axis (316) extending out from the device (1) and securely connected with both sides of the hanger (50) will then activate the brake operation to the disk (63) to provide resistance necessary to stop the bicycle, which will be described in detail in the following description.

All bicycle riders know that the braking affect results from two brake shoes clamping tightly on both sides of a disk so that the friction therebetween slows or stops the bicycle. Therefore, the structure of the disk brake device of the invention used on both sides of the disk (63) is basically the same.

Figure 3:
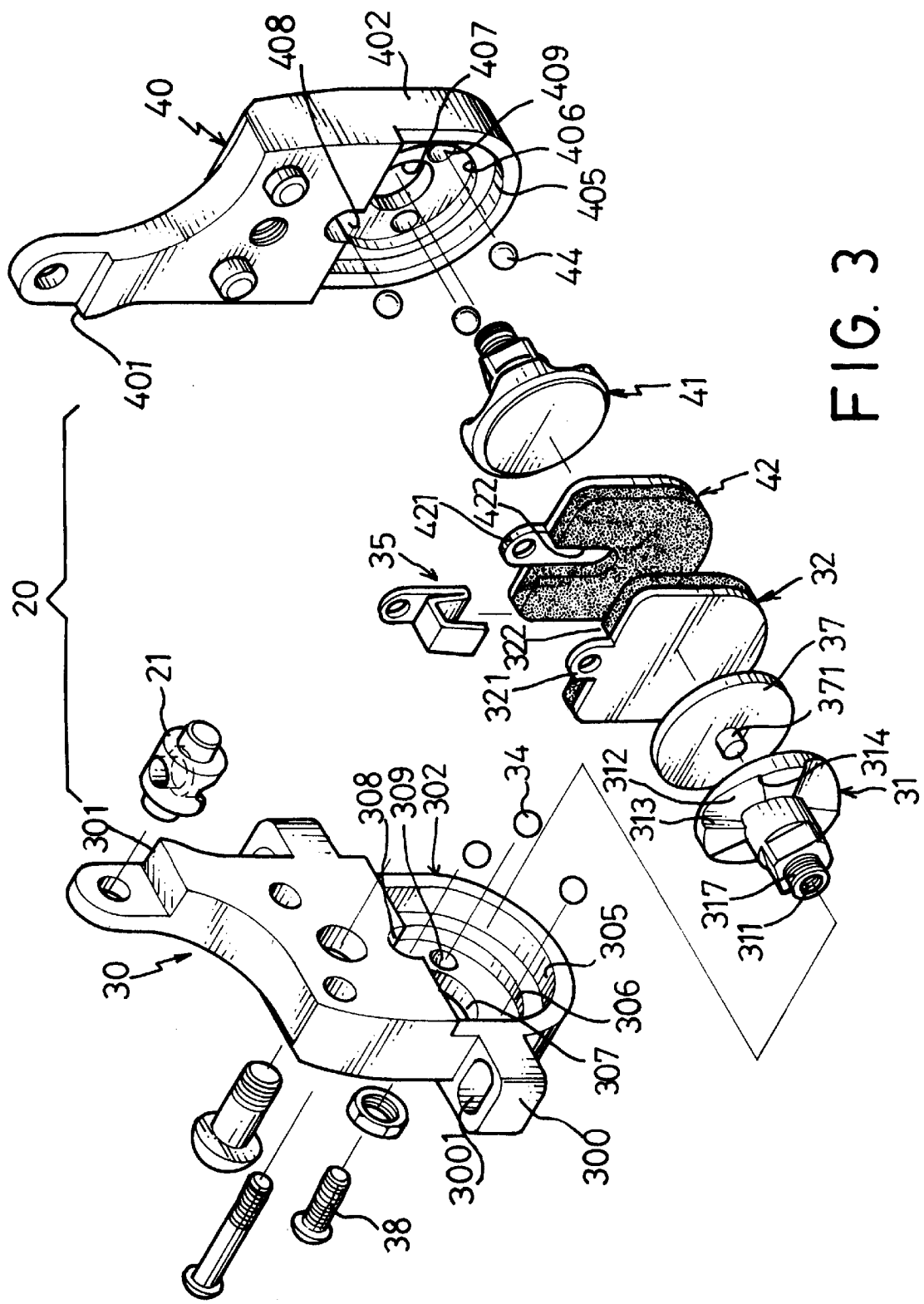
FIG. 3 is an exploded view of the disk brake device of the invention.

The yoke (20), as shown in FIG. 3, has a first yoke (30) and a second yoke (40) complementarily configured to the first yoke (30) and securely connected therewith. The first and second yokes (30, 40) both have a seat (301, 401) formed in the upper half thereof in such a way that the guide (21) is able to be seated thereon. The lower halves of the first and second yokes (30, 40) are provided with an shell (302, 402) configured and sized to be received in the recess (12) of the bracket (10). Each of the shells (302, 402) define therein a first cutout (305, 405), a second cutout (306, 406) communicating with the first cutout (305, 405), a through hole (307, 407) and a third cutout (308, 408) communicating with the first cutout (305, 405). Two driven plates (31, 41) are respectively and securely received within the second cutout (306, 406) and a portion of which extends out from the through holes (307, 407). Furthermore, the first and the second yokes (30, 40) define a plurality of openings (309, 409) for receiving therein ball bearings (34, 44). The assembly of the first and the second yokes (30, 40) is conventional in the art and each is complementary to each other, so that the detailed description thereof is not necessary.

When the first yoke (30) and the second yoke (40) are assembled, the first cutouts (305, 405) define therebetween a chamber (not shown or labeled) for receiving the first and second driven plates (31, 41), the driving plate (37) and the first and second brake shoes (32, 42). The aforementioned driven plates (31, 41) are respectively received in the second cutout (306, 406) a portion of which extends out from the through holes (307, 407). Only the first driven plate (31) has a channel (311) defined therein to be engaged with an adjusting bolt (38) screwed into the channel (311). When the driven plate (31) is received in the second cutout (306) of the first yoke (30), the side facing the surface defining the second cutout (306) has an inclined face (312) formed thereon and movably engaged with the ball bearing (34). The inclined face (312) has a deep area (313) receiving the ball bearing (34) therein and a shallow area (314). The driving plate (37) has a stud (371) extending into the channel (311) of the first driven plate (31) to connect with the adjusting bolt (38). A first and second brake shoe (32, 42) are then received in the first cutouts (305, 405) to have the driving plate (37) and the first and second driven plates (31, 41) enclosed in the shells (302, 402) of the first and second yoke (30, 40) respectively. Both the first and second brake shoes (32, 42) are provided with a connector (321, 421) which are configured and sized to fit into the third cutouts (308, 408) in such a way that the first and second brake shoes (32, 42) are secured to the first and the second yokes (30, 40). Each of the first and the second brake shoes (32, 42) is further provided with a recess (322, 422) in the face opposite to the face facing the driven plates (31, 41). When the first and second brake shoes (32, 42) are secured to the first and second yoke (30, 40) respectively, a spacer (35) is received between the recesses (322, 422) to keep the first and the second brake shoes (32,42) separate from each other at all times.

Figure 5:
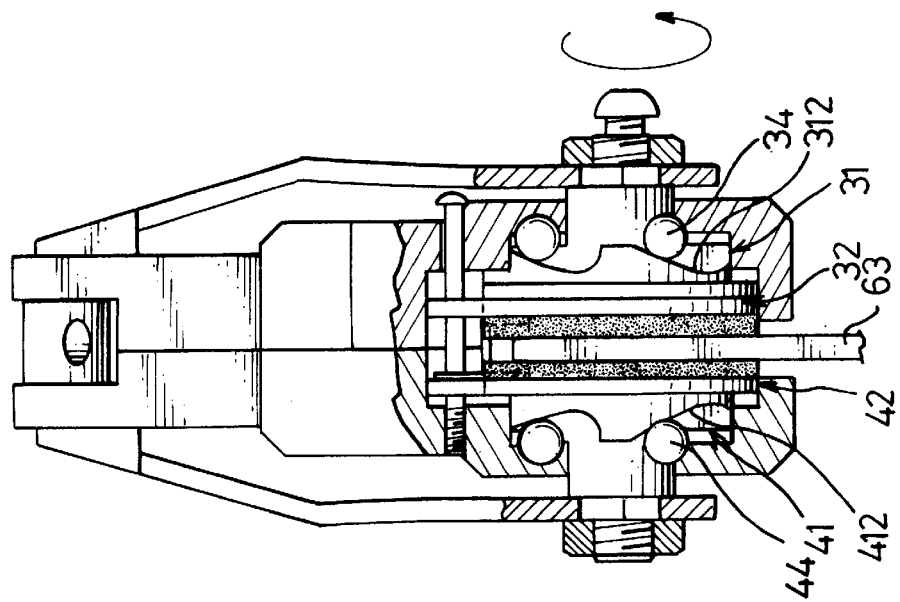
FIG. 5 is a sectional view showing the movement of the brake shoes of both sides of the disk.
Figure 4:
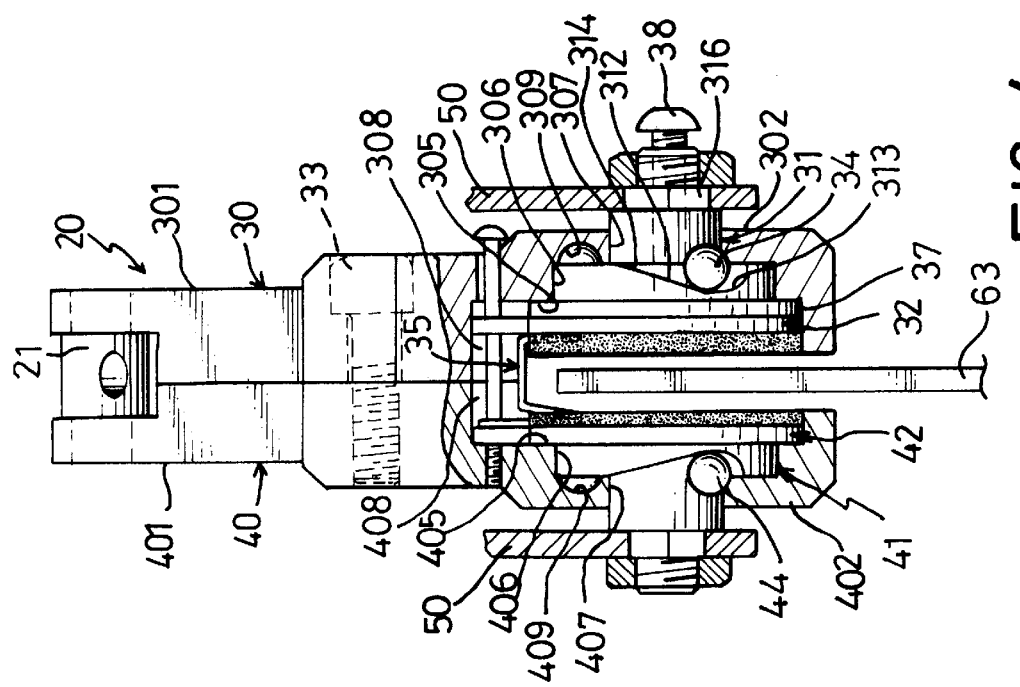
FIG. 4 is a sectional view showing the interrelationship of components of the disk brake device when assembled.
Figure 6:
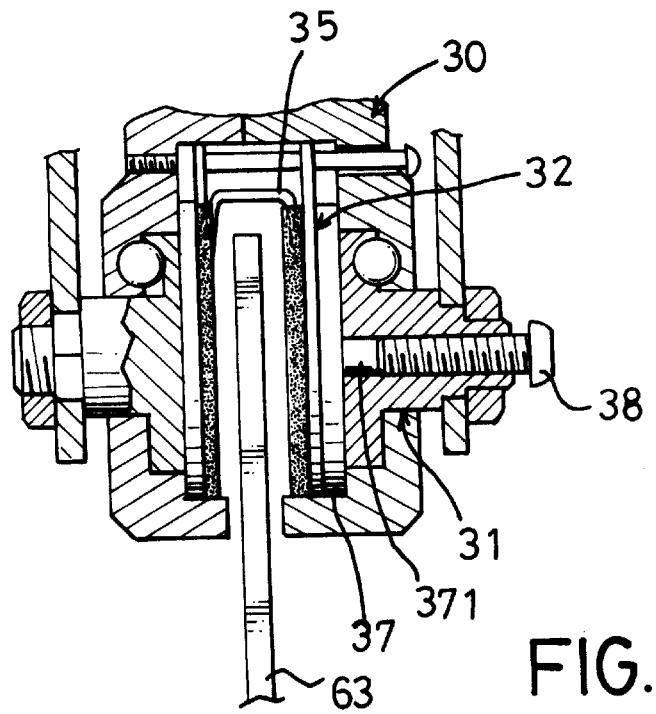
FIG. 6 is a sectional view showing the adjustment of only one of the brake shoes.
Figure 7:
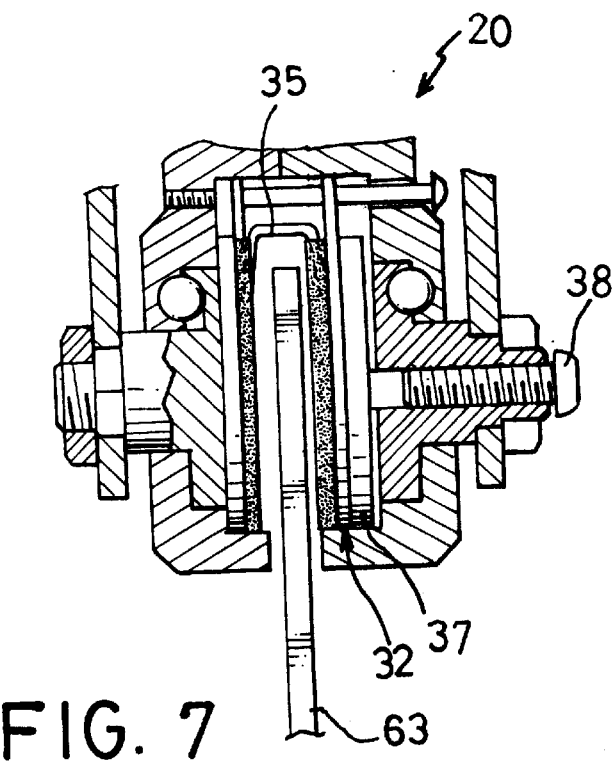
FIG. 7 is a sectional view showing the adjustment of the distance between the other brake shoe and the disk.

When the components described above are assembled in the first and the second yokes (30, 40) respectively, as shown in FIG. 4, it is seen that the ball bearings (34, 44) are received in the deep areas (313, 413) of the first and the second driven plates (31, 41). As the hanger (50) is pivoted relative to the yoke (20) due to the force exerted on the brake line (62), the axle (316) will also pivot with respect to the yoke (20). As already known from the previous description that the axle (316) is a part of the first driven plate (31) (the axle of the second yoke (40) is omitted), so that when the axle (316) is pivoted by the hanger (50), the first and the second driven plates (31, 41) pivot. The ball bearings (34, 44) received in the deep areas (313, 413) will then force the first and the second driven plates (31, 41) to displace in a direction opposite to each other as the ball bearings (34,44) move along from the deep areas (312, 413) to the shallow areas (314, 414) as a result of the pivotal movement of the hanger (50) and accordingly the driven plates (31. 41). Due to the movement of both driven plates (31, 41), the first and the second brake shoes (32, 42) will accordingly be forced to move toward each other and eventually will securely engage with the disk (63) which is positioned between the first and the second brake shoes (32, 42), as shown in FIG. 5. The friction between the first and the second brake shoes (32, 42) will provide the rider sufficient resistance to slow or stop the bicycle. However, if one of the brake shoes (32, 42) is excessively worn due to friction with the disk (63), the resistance necessary to stop the bicycle will not be sufficient. Therefore, adjust the disk brake device of the invention, the rider (user) has to tighten the adjusting bolt (38) to push the driving plate (37) together with the first brake shoe (32) further toward the second brake shoe (42) via the channel (311) of the driven plate (31) and the stud (371) of the driving plate (37), as shown in FIGS. 6 and 7. Because the spacer (35) always keeps the two brake shoes (32, 42) separate from each other, a minimum distance is still kept between them to allow the disk (63) to be positioned. It is noted that when adjusted, the adjusting bolt (38) is moved further inward toward the first driving plate (37), which causes the first brake shoe (32) to be closer to the disk (63). This is only an adjustment of one side of the brake shoes, i.e. (32). The adjustment of the other brake shoe, i.e. (42) will then be described in the following:

Referring back to FIGS. 2 and 3, except for the two first holes (11) defined in the bracket (10), the two second holes (13) are defined in a direction perpendicular to the direction of the first holes (11) and separated from each other with the recess (12). The first yoke (30) has a pair of ears (300) each defining therein an elongated hole (3001). Each of the elongated holes (3001) corresponds to one of the second holes (13) of the bracket (10), such that when the yoke (20) is mounted on the bracket (10) with the help of the alignment of the second holes (13) and the elongated holes (3001) anda bolt (39), a user can still adjust the position with respect to the bracket (10) via the bolt (39).

As discussed above, the distance between the first brake shoe (32) and the disk (63) is adjusted, the distance between the second brake shoe (42) with the disk (63) is adjusted by adjusting the relative position of the yoke (20) to the bracket (10). It may be obvious that after the best mode of the invention is revealed, several other changes, modifications would be obvious to those skilled in the art. These changes, modifications may include an extra driving plate added between the second driven plate (41) and the second brake shoe (42) to function as an adjustment to the distance between the second brake shoe (42) and the disk (63).

From the foregoing, it is seen that the objects hereinbefore set forth may readily and efficiently be attached, and since certain changes may be made in the above construction and different embodiments of the invention be implemented without departing from the scope thereof, it is intended that all matter contained in the above description or shown in the accompanying drawings shall be interpreted as illustrative and not in a limiting sense.

What is claimed is:

1. A disk brake device for use with a bicycle comprising:
a bracket adapted to be securely connected with the front fork of the bicycle and having a pair of holes, a pair of yokes securely connected together and movably mounted on the bracket and defining therebetween a seat, a guide securely positioned on the seat and having a brake line adapted to be inserted therethrough, a hanger pivotally connected with the pair of yokes and having the brake line adapted to be securely connected thereto, a pair of driven plates each pivotally and movably received in one of the pair of yokes and engaged with ball bearings inside of the yokes a pair of brake shoes each movably received in one of the pair of yokes and securely engaged with one of the pair of driven plates and a disk securely positioned between the pair of brake shoes and adapted to be selectively engaged by the pair of brake shoes, the improvements comprising:
one of the driven plates extends out from one of the pair of yokes and defines therein a channel for receiving an adjusting bolt therein, and
a driving plate is added between the brake shoe and the driven plate and has a stud extending into the channel to be in contact with the adjusting bolt.

2. The disk brake device for use with a bicycle as claimed in claim 1, wherein each of the pair of brake shoes has a recess defined therein for receiving therebetween a spacer which is securely connected between the pair of the yokes.

3. The disk brake device for use with a bicycle as claimed in claim 1 further having an elongated hole defined in one of the pair of yokes thereby allowing the position of the pair of yokes to be movable relative to the bracket.

4. The disk brake device for use with a bicycle as claimed in claim 1, wherein each of the pair of yokes has at least one opening defined therein for receiving therein at least one of said ball bearings to be engaged with one of the driven plates.

5. The disk brake device for use with a bicycle as claimed in claim 4, wherein each of the driven plates has an inclined surface which is divided into a deep area and a shallow area.

6. The disk brake device for use with a bicycle as claimed in claim 5, wherein at least one of said ball bearings is movable between the deep area and the shallow area of the driven plate.

* * * * *